United States Patent
Borkenhagen et al.

(10) Patent No.: US 6,263,404 B1
(45) Date of Patent: Jul. 17, 2001

(54) ACCESSING DATA FROM A MULTIPLE ENTRY FULLY ASSOCIATIVE CACHE BUFFER IN A MULTITHREAD DATA PROCESSING SYSTEM

(75) Inventors: John Michael Borkenhagen; Duane Arlyn Averill, both of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/976,533

(22) Filed: Nov. 21, 1997

(51) Int. Cl.$^7$ ...................................................... G06F 12/08
(52) U.S. Cl. ............................................................ 711/137
(58) Field of Search ...................................... 711/118, 138, 711/213, 220, 137

(56) References Cited

U.S. PATENT DOCUMENTS

| | | | |
|---|---|---|---|
| 4,156,906 | 5/1979 | Ryan | 364/200 |
| 4,217,640 | 8/1980 | Porter et al. | 364/200 |
| 4,245,303 | 1/1981 | Durvasula et al. | 364/200 |

(List continued on next page.)

FOREIGN PATENT DOCUMENTS

| | | | |
|---|---|---|---|
| 0614146 | 9/1994 | (EP) | G06F/12/08 |
| 0747816 | 12/1996 | (EP) | G06F/9/46 |

OTHER PUBLICATIONS

Handy, "The Cache Memory Book", 1993, p. 8–14 & 42–44.*

(List continued on next page.)

*Primary Examiner*—Kevin L. Ellis
(74) *Attorney, Agent, or Firm*—Wood, Heron & Evans

(57) ABSTRACT

A memory cache sequencer circuit manages the operation of a memory cache and cache buffer so as to efficiently forward memory contents being delivered to the memory cache via the cache buffer, to a multithreading processor awaiting return of those memory contents. The sequencer circuit predicts the location of the memory contents that the processor is awaiting, and speculatively forwards memory contents from either the cache buffer or memory cache, while simultaneously verifying that the speculatively forwarded memory contents were correctly forwarded. If the memory contents were incorrectly forwarded, the sequencer circuit issues a signal to the processor receiving the speculatively forwarded memory contents to ignore the forwarded memory contents. This speculative forwarding process may be performed, for example, when a memory access request is received from the processor, or whenever memory contents are delivered to the cache buffer after a cache miss. The sequencer circuit includes a plurality of sequencers, each storing information for managing the return of data in response to one of the potentially multiple misses and resulting cache linefills which can be generated by the multiple threads being executed by the processor. For each thread, there is one designated sequencer, which is managing the most recent cache miss for that thread; the information stored by the designated sequencer is used to predict the location of data for speculative forwarding, subject to subsequent verification based on the information in other sequencers and the cache directory.

61 Claims, 5 Drawing Sheets

U.S. PATENT DOCUMENTS

| | | | |
|---|---|---|---|
| 4,313,158 | | 1/1982 | Porter et al. .................... 364/200 |
| 5,023,776 | | 6/1991 | Gregor ............................. 364/200 |
| 5,233,702 | | 8/1993 | Emma et al. .................... 395/425 |
| 5,375,223 | | 12/1994 | Meyers et al. .................. 395/425 |
| 5,423,016 | | 6/1995 | Tsuchiya et al. ................ 395/425 |
| 5,500,950 | * | 3/1996 | Becker et al. .................... 395/445 |
| 5,535,361 | | 7/1996 | Hirata et al. .................... 395/472 |
| 5,539,895 | | 7/1996 | Bishop et al. ................... 395/465 |
| 5,592,634 | | 1/1997 | Circello et al. .................. 395/586 |
| 5,613,081 | | 3/1997 | Black et al. ..................... 395/403 |
| 5,630,075 | | 5/1997 | Joshi et al. ...................... 395/250 |
| 5,644,752 | | 7/1997 | Cohen et al. .................... 395/449 |
| 5,652,859 | | 7/1997 | Mulla ............................... 395/473 |
| 5,657,480 | | 8/1997 | Jacobson ......................... 395/555 |
| 5,680,573 | | 10/1997 | Rubin et al. ..................... 395/456 |
| 5,696,936 | | 12/1997 | Church et al. ................... 395/465 |
| 5,701,503 | | 12/1997 | Singh et al. ..................... 395/800 |
| 5,727,203 | | 3/1998 | Hapner et al. ................... 395/614 |
| 5,860,151 | * | 1/1999 | Austin et al. .................... 711/213 |
| 5,900,022 | * | 5/1999 | Kranich ............................ 711/205 |
| 5,924,128 | * | 7/1999 | Luick et al. ..................... 711/220 |

OTHER PUBLICATIONS

Farkas, Keith et al, "Complexity/Performance Tradeoffs With Non–Blocking Loads", Computer Architecture News, vol. 22, No. 2, Apr. 1, 1994, pp. 211–222.

Israel, Paul et al, 1995 Electronic Engineering Times (Jun. 19), pp. 78–80, "Chip Set Aims to Speed Secondary Cache—Parallelism Enhances Level 2 Cache Runs".

Jouppi, Norman P., 17th Annual International Symposium on Computer Architecture (May 28–31, 1990), pp. 364–373, "Improving Direct–Mapped Cache Performance by the Addition of a Small Fully–Associative Cache and Prefetch Buffers".

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stiliadis, Dimitrios et al, IEEE Transactions on Computers, vol. 46, No. 5 (May 1997), pp. 603–610, "Selective Victim Caching: A Method to Improve the Performance of Direct–Mapped Caches".

* cited by examiner

ACCESSING DATA FROM A MULTIPLE ENTRY FULLY ASSOCIATIVE CACHE BUFFER IN A MULTITHREAD DATA PROCESSING SYSTEM

CROSS-REFERENCE TO RELATED APPLICATIONS

This application is related to the following U.S. patent applications, the subject matter of which are hereby entirely incorporated by reference herein: (1) U.S. application Ser. No. 08/958,716 entitled METHOD AND APPARATUS FOR SELECTING THREAD SWITCH EVENTS IN A MULTITHREADED PROCESSOR, filed Oct. 23, 1997, pending, (2) U.S. application Ser. No. 08/956,875 entitled AN APPARATUS AND METHOD TO GUARANTEE FORWARD PROGRESS IN A MULTITHREADED PROCESSOR, filed Oct. 23, 1997, pending, (3) U.S. application Ser. No. 08/956,718 entitled ALTERING THREAD PRIORITIES IN A MULTITHREADED PROCESSOR, filed Oct. 23, 1997, pending, (4) U.S. application Ser. No. 08/956,577 entitled METHOD AND APPARATUS TO FORCE A THREAD SWITCH IN A MULTITHREADED PROCESSOR, filed Oct. 23, 1997, pending, (5) U.S. application Ser. No. 08/957,002 entitled THREAD SWITCH CONTROL IN A MULTITHREADED PROCESSOR SYSTEM, filed Oct. 23, 1997, pending, (6) U.S. application Ser. No. 08/773,572 entitled BACKGROUND COMPLETION OF INSTRUCTION AND ASSOCIATED FETCH REQUEST, filed Dec. 27, 1996, pending, (7) U.S. application Ser. No. 08/761,378 entitled MULTI-ENTRY FULLY ASSOCIATED TRANSITION CACHE, filed Dec. 9, 1996, pending, (8) U.S. application Ser. No. 08/761,380 entitled METHOD AND APPARATUS FOR PRIORITIZING AND ROUTING COMMANDS FROM A COMMAND SOURCE TO A COMMAND SINK, filed Dec. 9, 1996, pending, (9) U.S. application Ser. No. 08/761,379 entitled METHOD AND APPARATUS FOR TRACKING PROCESSING OF A COMMAND, filed Dec. 9, 1996, pending, (10) U.S. application Ser. No. 08/675,315 entitled MULTI-THREAD STORAGE CELL, filed Jul. 3, 1996, now U.S. Pat. No. 5,778,243, issued Jul. 7, 1998, and (11) U.S. application Ser. No. 08/473,692 entitled METHOD AND SYSTEM FOR ENHANCED MULTITHREAD OPERATION IN A DATA PROCESSING SYSTEM BY REDUCING MEMORY ACCESS LATENCY DELAYS, filed Jun. 7, 1995, pending.

FIELD OF THE INVENTION

The present invention relates to routing of memory contents to an execution unit from a memory cache in a manner which reduces latency.

BACKGROUND OF THE INVENTION

In a data processing system, instructions and associated data are transferred from memory to one or more processors for processing, and then resulting data generated by the processor is returned to memory for storage. Thus, typical processing operations involve frequent and repetitive reading and writing from memory. As a result, memory access delays are often a primary limitation in the performance of a data processing system. Preferably, therefore, memory access speed should be maximized to maximize performance. However, often cost and other constraints require that the main memory be comprised of relatively long access time circuitry. To overcome the resulting performance drawbacks, memory caches are typically used.

A memory cache typically includes a relatively small, but high speed, bank of memory, which can be more rapidly accessed by the processor(s) than the main memory. Memory locations in the main memory are duplicated in the cache. When a particular memory location being accessed by the processor is duplicated in the cache—event which is known as a cache "hit"—the processor may rapidly access the cache instead of waiting for access to main memory. The cache is managed with the goal of maximizing the fraction of accesses which are hits in the cache.

Caches are typically organized into "lines", which are relatively long sequences of memory locations found in main memory. Typically, when a memory location accessed by a processor is not duplicated in the cache—an event which is known as a cache "miss"—an entire line containing the missed memory location, and neighboring memory locations, is brought into the cache as part of retrieving the missed location from other caches or main memory—an event which is known as a "linefill" into the cache.

Typically, each cache line is associated with multiple groups of locations in the main memory. Each cache line stores duplicates of associated groups of memory locations, as well an indication of which groups of memory locations are currently stored in that line. Thus, when a processor requests access to a particular memory location, the cache line corresponding to that memory location is accessed to determine whether that cache line is storing the group of memory locations which includes the requested location. If so, the requested memory location is accessed in the cache. If not, a group of memory locations including the requested location is linefilled into the cache.

Typically, an n-way associative cache stores n of the several groups of locations corresponding to a cache line in the cache at one time. When a group of memory locations is linefilled into the cache, memory contents in the same cache line may need to be replaced. If the contents of the replaced cache line have been modified, then the line has to be stored back into the corresponding group of locations in the main memory—an event which is known as a "writeback" from the cache.

In high performance data processing systems, often there are two or more caches, organized so that a processor attempts to access a memory location by first attempting to locate a duplicate of that location in a "level 1" or L1 cache. If there is a miss in the L1 cache, then an attempt is made to locate a duplicate of the desired memory location in a "level 2" or L2 cache. If there is a miss in the L2 cache, each lower level cache is sequentially checked in the same manner. If there is a hit in one of the caches, then the desired memory locations are obtained from that cache, and typically, the accessed memory locations are duplicated, along with neighboring locations completing a cache line, into the appropriate line of at least the L1 cache—although in some cases an access may be "cache-inhibited", in which case the data is not stored in the L1 cache after retrieval. If there are misses in all of the caches, the missed location, along with neighboring locations completing a cache line, is retrieved from main memory, and filled into one or more of the caches if the access is not cache-inhibited. Similarly, if a line is written back from a cache, the line may be written to a lower level cache, main memory, or both.

Typically, lines of instructions and data are transferred from caches and processors to other caches and processors using buffers. For instance, in one architecture two buffers are respectively connected to a level 1 cache and a level 2 cache. These buffers are also connected to main memory, a host processor, and possibly other processors via a system bus. The buffers allow for a smooth transition of data or instructions between components having different transfer rates. Each line in a conventional cache buffer strictly handles either fill commands or write back commands, and includes memory space which can store a finite number of cache lines, e.g., four. Each cache line in a buffer is, therefore, designated as a fill cache line or a write back cache line. In a multi-way associative cache, cache buffer lines may be used for fills or writebacks, and are dynamically configured for the appropriate purpose.

In addition to the use of caches to improve memory access performance, other well known techniques have been used to improve the performance of data processing systems. One technique is to divide a processing task into independently executable sequences of instructions called threads. Using this technique, when a processor, for any number of reasons, cannot continue processing or execution of a thread, the processor switches to another thread and continues processing of that thread, rather than stalling. For example, when a cache miss stalls processing of one thread, the processor may switch to other threads which are able to continue processing. By the time the processor returns to the stalled thread, the missed location may have been linefilled into the cache, and that thread can resume with minimal additional delay.

The term "multithreading", when used in the context of software, is used to refer to a particular organization scheme which can be used in writing computer programs. In this software context, therefore, "multithreading" does not relate to the manner in which computer programs are physically executed by the processor. Thus, software "multithreading" is different from the kind of "multithreading" discussed in this application. The kind of multithreading to which this application relates, may be referred to as "hardware multithreading", i.e., processor configurations permitting a processor to switch between multiple threads of instructions upon various conditions. Thus, in this application, the terms "thread" and "multithreading" will be understood to refer to "hardware multithreading", and not methods for software organization.

While the technique of multithreading, and the use of memory caches, both enhance the performance of a data processing system, combining these techniques raises substantial complexities. In particular, as noted above, when a memory access misses in the L1 cache, the required memory contents must be accessed from a higher level cache or main memory. When the memory contents are located, they must be delivered to the requesting processor, and also filled into one of the caches. While this process appears straightforward, in a multithreading environment or other environments where there may be multiple outstanding cache misses, efficient management of this process becomes substantially more difficult.

In particular, when multiple threads each have outstanding cache misses, and the content of a memory location is returned in response to a miss, several determinations must be made. First, a determination must be made which cache miss the memory location is for and which thread is awaiting that memory location. This first determination is complicated by the fact that two different memory locations may be associated with the same cache line; thus, two threads may be awaiting delivery of different memory locations into the same cache line. It is therefore necessary to confirm that memory contents being returned to a cache line relate to the specific memory location that caused a thread's cache miss.

Furthermore, once it is known which thread the memory contents are intended for, a determination must be made as to how to deliver the memory contents to the requesting thread, i.e., directly from the returning higher level cache or memory, via the cache buffer, or from the L1 cache. Memory access times can be substantially reduced if, at least in some circumstances, memory contents returning from a higher level cache or main memory can be directly delivered to the awaiting processor, or delivered from the cache buffer, without first waiting for an entire cache line to be filled into the L1 cache. However, for this to be possible, the determination of which thread the memory contents are intended for, must be made essentially simultaneously with the return of the cache line from main memory, which may not be possible using known cache management schemes.

SUMMARY OF THE INVENTION

In accordance with principles of the present invention, a memory cache sequencer circuit efficiently manages the operation of a memory cache and cache buffer so as to efficiently forward memory contents being delivered to the cache memory to a processor awaiting return of those memory contents.

In accordance with principles of the present invention, the sequencer circuit predicts the location of the memory contents that the processor is awaiting, and speculatively forwards memory contents from either the cache buffer or memory cache, while verifying that the speculatively forwarded memory contents were correctly forwarded. If the memory contents were incorrectly forwarded, the sequencer circuit issues a signal to the processor receiving the speculatively forwarded memory contents to ignore the forwarded memory contents. This speculative forwarding process may be performed, for example, when a memory access request is received from the processor, or whenever memory contents are delivered to the cache buffer after a cache miss.

The specific embodiment described below is a multithreading processing circuit. In this environment, misses and the resulting cache linefills can be generated by a plurality of threads, and each cache miss must be associated with the thread generating the miss. In the disclosed embodiment, there are two such threads. Accordingly, there are a plurality of sequencers in the sequencer circuit, each sequencer potentially managing the return of memory contents in response to a cache miss generated by one of the plurality of threads. In the disclosed embodiment, there are three such sequencers. A sequencer is enabled, i.e., marked "valid", when a new cache miss is experienced, and initialized with information needed to manage the forwarding of memory contents to the processor in response to the miss. A sequencer is disabled, i.e., marked "invalid", upon completion of a linefill of memory contents from the cache buffer to the cache in response to the miss. Among other information, each sequencer stores the identity of the thread for which it is managing the return of memory contents, so that the speculative memory process described above can be appropriately performed when memory contents are delivered to the cache buffer.

In specific embodiment described below, the sequencers store various additional information to aid accurate forwarding of memory contents to the processor. Specifically, when a cache miss occurs due to the absence of requested memory contents in a cache line, the sequencer assigned to management of the cache miss stores the identity of the cache line. Later, when a memory access request is issued by the processor, the cache line identified by a sequencer associated with that thread, if there is one, is compared to the cache line which would contain the memory contents requested by the memory access request. If there is a match, this suggests that the requested memory contents are in the process of transfer to the cache, and can be found in the cache buffer; therefore, in this case, memory contents are speculatively forwarded from the cache buffer. If there is no match, this suggests that the requested memory contents have already been forwarded to the cache, so memory contents are speculatively forwarded from the cache.

As elaborated in the following detailed description, because memory contents may be forwarded to the processor directly from the cache buffer, or may be delivered to the processor via a bypass path simultaneous with delivery to the cache buffer, it is possible that, before the cache has been completely linefilled from the cache buffer in response to a miss, the thread which generated that miss will generate a second miss. To deal with this possibility, each sequencer also stores an indication of whether the sequencer is managing return of memory contents for the most recent incompletely serviced miss for the thread. The sequencer managing the most recent incompletely serviced miss for a thread is the "designated" sequencer for the thread. Because the designated sequencer is managing the most recent cache miss for the thread, in the speculative forwarding process, the cache line which would contain the memory contents requested by the memory access request, is compared to the cache line identified by the designated sequencer for the thread.

To ensure that the designated sequencer is accurately identified, whenever a miss is experienced, and information is stored in a sequencer to manage forwarding of memory contents in response to the miss, that sequencer is marked as the designated sequencer for the thread which experienced the miss, and any other sequencer managing a miss for the same thread is marked non-designated. Furthermore, when a designated sequencer is disabled upon completion of a linefill from the cache buffer to the cache, another sequencer managing forwarding of memory contents for the same thread, if any, is marked designated.

In the disclosed specific embodiment, a cache directory stores an indication of the memory contents which are present in each line of the cache. When a memory access request causes a miss in a cache line, the cache directory is updated to indicate, for that cache line, the range of memory addresses which will be linefilled into that cache line in response to the miss. Accordingly, when memory contents are speculatively forwarded from the cache buffer or from the cache, the memory address identified by the memory access request is compared to the range of memory addresses in the cache directory, to verify that the memory contents speculatively forwarded from the cache buffer are those requested by the memory access request.

Because the cache directory is updated upon a miss and before completion of a linefill to a cache line, the cache directory is not always used as the sole verification of the memory contents in the cache buffer. As noted above, when the cache line identified by the designated sequencer for a thread does not match the cache line which would contain the memory contents requested by the memory access request, this suggests that the requested memory contents have already been forwarded to the cache, and memory contents are speculatively forwarded from the cache. However, it may be that the requested memory contents are still being linefilled into the cache, for example, in response to a miss in another thread. To determine whether this is the case, the sequencers also store an indication of the range of memory addresses that are being linefilled into the cache in response to the miss the sequencer is managing. When memory contents are speculatively forwarded from the cache, the address identified by the memory access request is compared to the range of memory addresses identified by all of the sequencers. If there is a match, this indicates that the desired memory contents are not present in the cache, but rather are in the process of being linefilled to the cache, and the sequencer issues a signal to the processor to ignore the forwarded memory contents.

These and other features and advantages, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
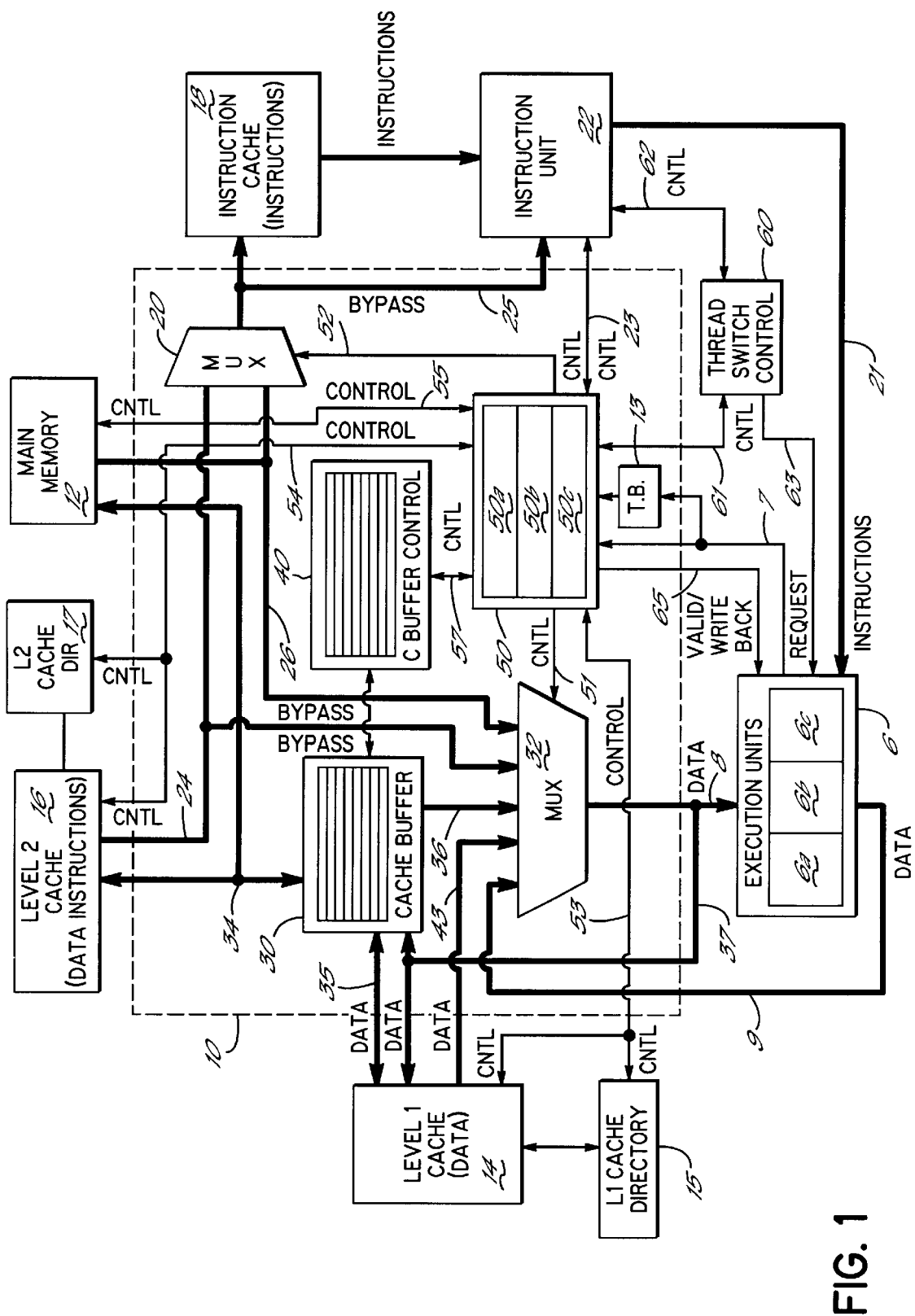
FIG. 1 is a block diagram of a storage control unit for a computer system capable of implementing principles of the present invention.

Referring to FIG. 1, the execution units 6 of a computer system, interact with a storage control unit 10 to obtain data and instructions to execute a multi-thread computer program. Execution units 6 have a pipelined data path and include a plurality of execution units such as noted at 6a, 6b and 6c; each execution unit has different functional responsibilities in performing the operations identified in a program. Execution units 6 access a memory location via storage control unit 10 by delivering a memory access request over a line 7 to storage control unit 10. Using circuitry and functionality described below, storage control unit 10 responds by obtaining the requested data, and delivering the data to an execution unit 6 over data bus 8, or by receiving the data from an execution unit 6 over data bus 9. Storage control unit 10 also delivers, over control lines 65, a "valid" signal indicating whether the data returned to execution units 6 is valid or invalid. Only if the data returned over data bus 8 is indicated as "valid" on control lines 65, is that data used by execution units 6; otherwise, the data is discarded.

Storage control unit 10, implementing principles of the present invention, controls the input and output of data from/to execution units 6 using various storage units, including caches, buffers and main memory. Storage control unit 10 further manages the delivery and input of instructions to execution units 6.

As shown in FIG. 1, storage control unit 10 interfaces with a main memory 12. Main memory 12 typically comprises a bank of relatively high-volume, moderate speed memory such as one or more DRAM chips, and a bank of mass storage such as one or more disk drives. Main memory 12 implements a paging memory management scheme; specifically, the moderate speed memory stores pages of memory locations which have been swapped out of the mass storage device, facilitating more rapid access to these memory locations.

Each storage location in main memory 12 is associated with an "effective" address, which uniquely identifies that memory location among all of the memory locations in main memory 12. Each storage location in the bank of moderate speed memory is associated with a "real" address, which uniquely identifies that memory location among all other memory locations in the bank of moderate speed memory. To access a memory location, an effective address and/or a real address is delivered to main memory 12, and in response main memory 12 delivers the contents of the identified memory location. Storage control unit 10 incorporates a translation buffer 13, for translating effective addresses into real addresses; execution units 6 deliver an effective address to storage control unit 10 with a memory access request, which the translation buffer 13 translates into a real address.

To provide high speed access to frequently used memory locations, storage control unit 10 further interfaces with a number of cache memories, which comprise relatively high-cost, high speed memories. These caches include a level 1 or L1 cache 14, a level 2 or L2 cache 16, and an instruction cache 18.

L1 cache 14 stores a relatively few, e.g., 512 or 1024, cache lines. Each cache line stores a copy of a group of sequential memory locations in main memory 12, e.g., 128 sequential memory locations. To constrain the use of space in L1 cache 14 and streamline the operation of the memory control unit 10, only memory locations containing program data, as opposed to the instructions which comprise the program, are stored in L1 cache 14. Every effective address in main memory 12 is uniquely associated with a line in L1 cache 14; the associated line in L1 cache 14 for a particular effective address can be determined from a subset of the bits of the effective address. Through the same association, each cache line in L1 cache 14 is associated with several groups of sequential effective addresses that might be stored in that cache line. At any time, a cache line in L1 cache 14 can store a copy of sequential memory locations for two of the effective address ranges associated with that cache line.

An L1 cache directory 15 stores an identification of which sequential memory locations are being stored in L1 cache 14. Specifically, L1 cache directory 15 stores an indication of the ranges of real addresses of the memory locations in main memory 12 for which copies currently reside in, i.e., are resident in, a line of L1 cache 14. As noted above, multiple different groups of sequential memory locations in main memory 12 may map to the same line in L1 cache 14; accordingly, L1 cache directory 15 identifies which of the multiple different groups of memory locations in main memory 12 are resident in L1 cache 14. Specifically, L1 cache directory 15 includes one directory entry for each of the lines in L1 cache 14; accordingly, to determine whether a memory access to a particular effective and real address can be serviced from L1 cache 14, a subset of the bits of the effective address are used to locate an entry in L1 cache directory 15. Then, the real address ranges stored in the located entry of L1 cache directory 15 ar compared to the real address of the memory access. If the real address of the memory access falls within a range from the L1 cache directory 15, then the memory location needed for the access is resident in L1 cache 14, and the access can be performed in the L1 cache. If the real address of the access is not in any of the ranges, then the memory location needed for the access is not resident in L1 cache 14, and L2 cache 16 or main memory 12 must be accessed.

Instruction cache 18 and L2 cache 16 are similar in structure to L1 cache 14, although L2 cache 16 contains a substantially larger number of cache lines, e.g., 16384 or 32768 lines. Because L2 cache 16 is larger than L1 cache 14 or instruction cache 18, data found unavailable in L1 cache 14 or instruction cache 18 may be available in L2 cache 16; only after there has been a miss in both the L1/instruction and L2 caches, will a data memory access be referred to the main memory 12.

L1 cache 14 stores only memory locations containing data, L2 cache 16 stores memory locations containing both data and instructions, and instruction cache 18 stores only instructions. This separation of data and instructions streamlines the storage control unit 10. L2 cache 16 is similar to L1 cache 14, however, real addresses in main memory 12 are associated with line in L2 cache 16, whereas effective addresses in main memory 12 are associated with lines in instruction cache 18. Each line in L2 cache 16 and instruction cache 18 is associated with a number of groups of sequential memory addresses, a number of which may be stored in the associated L2 cache line or instruction cache line at one time. Further, L2 cache 16 is associated with an L2 cache directory 17, containing an equal number of entries as the number of lines in L2 cache 16, and instruction cache 18 is similarly associated with an instruction cache directory (not shown). Each entry in L2 cache directory 17 is associated with one corresponding line in L2 cache 16, and identifies ranges of real addresses of the memory locations stored in L2 cache 16. To identify whether a desired real address is resident in L2 cache 16, selected bits from the real address are used to select a uniquely associated one of the entries in L2 cache directory 17, and then the real address ranges stored in the selected L2 cache directory entry are then compared to the desired real address.

As noted above, L2 cache 16 stores both instructions and data for execution units 6. Instruction cache 18 obtains and stores only instructions from L2 cache or from main memory 12 via a multiplexer 20. An instruction unit 22 interacts with instruction cache 18 to obtain instructions for an execution unit 6 and deliver the instructions to the execution unit 6 over an instruction bus 21. When instruction unit 22 determines that a needed instruction is unavailable in instruction cache 18, instruction unit 22 delivers a control signal on line 23 to storage control unit 10 to request delivery of the instruction. To reduce the likelihood that an execution unit 6 will stall due to unavailability of instructions, instructions retrieved from L2 cache or main memory 12 are delivered immediately to instruction unit 22, without buffering. Specifically, if a requested instruction is available in L2 cache 16, the cache line containing the instruction is delivered from L2 cache 16 via bypass line 24 directly to multiplexer 20. The desired instruction is then delivered to instruction unit 22 via instruction bypass bus 25, while the entire cache line containing the instruction is delivered to instruction cache 18 and stored in a line of instruction cache 18. Similarly, if a requested instruction must be obtained from main memory 12, a group of locations from main memory including the desired instruction is delivered to multiplexer 20 via bypass line 26 directly to multiplexer 20. The desired instruction is then delivered to instruction unit 22 via instruction bypass bus 25, the entire group of locations containing the instruction is delivered to instruction cache 18 and stored in the appropriate line of instruction cache 18. If the instruction was retrieved from main memory 12, the entire group of locations including the instruction is also stored into cache buffer 30, for subsequent storage in a line of L2 cache 16.

Unlike instructions, which are bypassed, most data accesses are subject to buffering within storage control unit 10 before delivery to execution units 6. Specifically, storage control unit 10 includes a cache buffer 30, also known as a transition cache, and multiplexer 32 for managing the delivery of data from/to execution units 6 to/from L1 cache 14, L2 cache 16 and/or main memory 12. Cache buffer 30 includes a small number, e.g., eight lines of data storage, each line capable of storing the same quantity of data as a line in L1 cache 14 and L2 cache 16. The eight lines in cache buffer 30 are used to buffer lines stored in L1 cache 14 and L2 cache 16 or corresponding groups of memory locations in main memory 12, as data is transferred between the caches 14, 16 and main memory 12.

Cache buffer 30 is connected to L2 cache 16 and main memory 12 via a bi-directional bus 34. Bus 34 is used both for retrieval of lines of memory locations from L2 cache 16 and main memory 12, and for write-back of lines of modified memory locations to main memory 12. Cache buffer 30 is further connected to L1 cache 14 via a bi-directional bus 35, which is used both for delivery of lines of memory locations to L1 cache 14 from buffer 30 and for write-back of modified lines of memory locations from L1 cache 14 to buffer 30 for subsequent delivery to main memory 12. A further unidirectional bus 36 connects cache buffer 30 to multiplexer 32, and is used by cache buffer 30 to deliver the contents of a cache buffer line to multiplexer 32 when circumstances warrant, as discussed in substantially greater detail below. In addition, another unidirectional bus 37 connects multiplexer 32 to cache buffer 30, and is used to deliver data being stored by execution units 6 into a line of cache buffer 30, where appropriate. Bus 37 also connects to L1 cache 14 to deliver data being stored by execution units 6 into a line of L1 cache 14, where appropriate.

Cache buffer 30 is associated with a cache buffer control circuit 40, also known as a transition cache directory. Buffer control circuit 40 includes a number of entries, each entry corresponding to a line in cache buffer 30. Each entry in buffer control circuit 40 stores data identifying the current use and status of the associated cache buffer line; specifically, entries in buffer control circuit 40 identify whether the associated line is in use, and if so the kind of access for which the line is being used, the status of servicing the access and the real address of the access, as well as other detailed information. Whenever there has been a miss in the L1 cache 14, and data must be obtained from the L2 cache 16 or main memory 12, a line in cache buffer 30 is assigned to the miss, so that when the data is returned from the L2 cache 16 or main memory, the data is stored in the assigned line of cache buffer 30, and then transferred from this line to the L1 cache 14, L2 cache 16 and/or to execution units 6. Similarly, whenever the retrieval of a line into the L1 cache 14 or L2 cache 16 requires a write-back from that line to main memory, a line of cache buffer 30 is assigned to the write-back, so that the data is written back from the L1 cache 14 or L2 cache 16 into the assigned line of cache buffer 30, and then transferred from this line to main memory 12. Lines of cache buffer 30 are also assigned when instructions are retrieved for delivery to instruction cache 18 and written into L2 cache 16 as noted above. Furthermore, in every case where a new cache line will be written into the L1 cache 14, the L1 cache directory 15 is immediately revised to identify the range of real addresses of the data which will be delivered into the L1 cache line.

The assignment of cache lines to particular accesses and write-backs, and the process of obtaining data for accesses and write-backs into the cache buffer 30 and delivering the data out of the cache buffer 30, is managed by cache buffer control circuit 40 using the data stored therein. These operations and the activities of cache buffer control circuit 40 are described in detail in the above-referenced and herein-incorporated U.S. patent application Ser. No. 08/761, 378 entitled "MULTI-ENTRY FULLY ASSOCIATIVE TRANSITION CACHE", which was filed Dec. 9, 1996. For the purposes of this application, it is sufficient to note that cache buffer control circuit 40 manages the passage of data to and from L1 cache 14, L2 cache 16 and main memory 12, and delivers to sequencers 50 over control lines 57 an indication of the current status of the various transfer operations being managed by cache buffer control circuit 40. In particular, cache buffer control circuit 40 indicates when data is returning to a cache buffer line, triggering the activities described below with reference to FIG. 3B, and indicates when a cache buffer line has been completely delivered to L1 cache 14, triggering the activities described below with reference to FIG. 3C.

As noted above, an input of multiplexer 32 is connected to an output of cache buffer 30 via unidirectional bus 36, and the output of multiplexer 32 is connected to cache buffer 30 and to L1 cache 14 via unidirectional bus 37. Bus 37 also connects to a data input of execution units 6, such that an output of multiplexer 32 may be delivered to execution units 6. Further inputs of multiplexer 32 are connected via busses 43 and 9 to the outputs of L1 cache 14 and execution units 6, respectively. These connections permit data to be delivered to execution units 6 from cache buffer 30 via multiplexer 32 using busses 36 and 37, and permit data to be delivered to execution units 6 from L1 cache 14 via multiplexer 32 using busses 43 and 37, and permit data to be returned from execution units 6 for storage in L1 cache 14 or cache buffer 30 via multiplexer 32 using busses 9 and 37. Additional inputs to multiplexer 32 are further connected to bypass busses 24 and 34, to permit data to be delivered from L2 cache 16 and main memory 12 directly through multiplexer 32 to execution units 6.

Storage control unit 10 further includes sequencers 50 which monitor and communicate with other elements discussed above. Specifically, sequencers 50 include control logic forming a state machine, for managing the operation of storage control unit 10 to properly route data and instructions through storage control unit 10 to desired destinations. There are multiple sequencers 50 included in storage control unit 10, each having different roles. Most importantly, sequencers 50 are responsible for handling misses in the L1 cache 16 and instruction cache 18, by determining the location, in L2 cache 18 or main memory 12, of the needed data or instructions, and managing the return of data or instructions from that location to the requesting thread, and manage the storage of a line including the requested data or instructions in the L1 cache 16 or instruction cache 18.

In one embodiment of the present invention in which two threads are supported, there are three "data" sequencers 50a, 50b, 50c responsible for managing data accesses by execution units 6, and additional sequencers (not shown in FIG. 1) which are responsible for managing delivery of instructions to instruction unit 22. In accordance with principles of the present invention elaborated more fully below with reference to FIGS. 3A through 3D, the three data sequencers 50a, 50b and 50c manage the return of data so that, if possible, returning data is delivered to the execution unit 6 immediately as the data is returned from the L2 cache 18 or main memory 12 to cache buffer 30, or directly from the cache buffer 30, without waiting for the entire L1 cache line including the requested data to be written into the L1 cache 16. As discussed in more detail below, three data sequencers 50a, 50b and 50c are required to manage data accesses by two threads. Two sequencers are needed to manage two concurrent cache misses which may be generated by the two threads. A third sequencer is needed to manage a third cache miss which can be generated when one of the sequencers, after delivering requested data to the execution units 6 directly from the cache buffer 30 or L2 cache 16 or main memory 12, is occupied with managing storage, i.e., linefill, of a line including requested data into L1 cache 14, and the execution unit 6, having resumed processing upon receipt of the requested data, generates a new cache miss.

Sequencers 50 are connected to execution units 6 over control lines 7 and to instruction unit 22 over control lines 23. Over lines 7, sequencers 50 receive data access requests generated by execution units 6, and in response sequencers 50 manage access to the desired data, as described below in significantly greater detail. Further, over lines 23 sequencers 50 receive requests for delivery of instructions that instruction unit 22 was unable to obtain from instruction cache 18, and in response sequencers 50 manage delivery of the desired instructions from L2 cache 16 or main memory 12.

As part of managing data and instruction accesses, sequencers 50 generate control signals on lines 51 and 52 for controlling multiplexers 32 and 20 to deliver data and instructions, respectively, to the appropriate destination. To perform the appropriate control functions, sequencers 50 interact over control lines with the various elements described above. Specifically, sequencers 50 are connected via control lines 53, 54 and 55 to the L1 cache directory 15, L2 cache directory 17 and main memory 12, respectively, to deliver access requests to L1 cache directory 15, L2 cache directory 17 and main memory 12, and to monitor the delivery of data or instructions from those locations in order to route the data or instructions appropriately through multiplexers 32 and 20. Sequencers 50 are further connected via control lines 57 to cache buffer control logic 40 so that sequencers 50 may inform cache buffer 30 of the delivery of data to be buffered therein, and so that sequencers 50 may determine which data is buffered in cache buffer 30.

Sequencers 50 further interact with execution units 6 and a thread switch control circuit 60 to facilitate control of hardware multiplexing by execution units 6. In particular, sequencers 50, as part of managing the return of data to execution units 6, generate a "valid" signal as discussed above on control lines 65, to indicate whether data being returned over bus 8 is valid or not valid. As described in substantially greater detail below, sequencers 50 cause the speculative delivery of data to execution units 6 before a complete verification has been made that the data is valid. This approach speeds access to data in most circumstances, but in some cases causes invalid data to be forwarded to execution units, in which case sequencers 50 produce a signal on line 65 indicating that the returning data is invalid and should be discarded.

Furthermore, thread switch control circuit 60 interacts with sequencers 50 via control lines 61 and with instruction unit 22 via control lines 62, to determine whether and when execution units 6 should suspend processing of a currently active thread. If and when thread switch control circuit 60 determines that a thread switch from a currently active thread to a resumed thread is warranted, for example, when thread switch control circuit 60 receives an indication from sequencers 50 over lines 61 that the currently active thread has incurred a cache miss, and is stalled awaiting access to a memory location, or when thread switch control circuit 60 receives an indication from instruction unit 22 over lines 62 that the currently active thread has halted or stalled, then thread switch control circuit 60 informs other elements of the thread switch. Specifically, thread switch control circuit 60 informs execution units 6 of the thread switch via control lines 63, causing execution units 6 to save current register contents and other information relating to the current state of execution of the currently active thread, and causing execution units 6 to restore register contents and other state information for the resumed thread, and causing execution units 6 to flush execution pipelines to permit seamless resumption of the resumed thread. To complete the thread switch, thread switch control circuit 60 informs instruction unit 22 of the thread switch so that instruction unit 22 commences delivering to execution units 6, the instructions for the resumed thread. Further specific details on the operation of thread switch control circuit 60 and its interaction with storage control unit 10 and instruction unit 22 can be found in the above-referenced and herein-incorporated U.S. patent application Ser. No. 08/957,002 entitled "THREAD SWITCH CONTROL IN A MULTI-THREADED PROCESSOR SYSTEM", which was filed Oct. 23, 1997.

Figure 2:
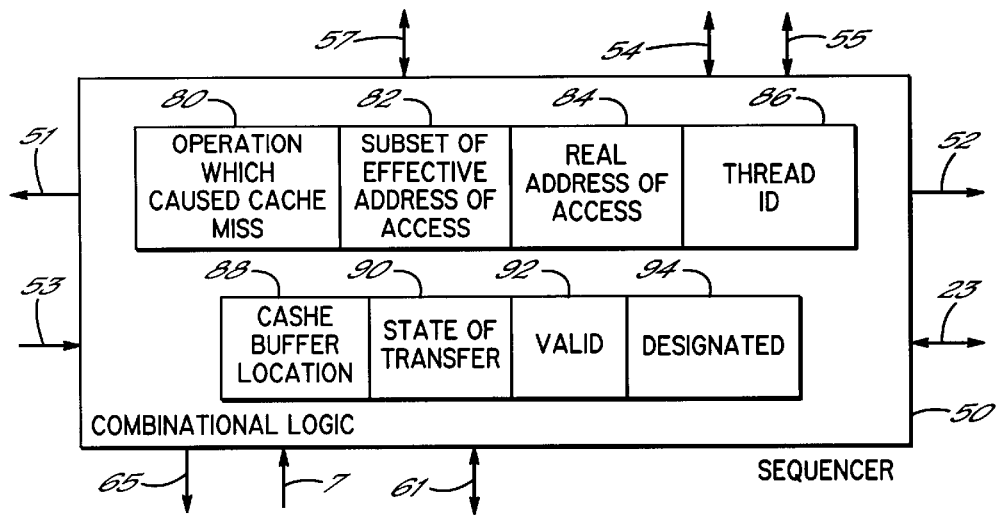
FIG. 2 is a register diagram illustrating the registers included in one of the sequencers of the storage control unit illustrated in FIG. 1.

Referring now to FIG. 2, the details of a sequencer 50 responsible for managing data accesses by execution unit 6 can be explored. Sequencer 50 includes, as noted above, a block of combinational logic forming a state machine for controlling data access. The state information for this state machine is stored in various registers, illustrated in FIG. 2. A first register 80 stores an identification of a memory access operation which caused a cache miss. As will be seen below, the more elaborate operations performed by a sequencer involve the accessing of data which is not found in the L1 cache; in such cases register 80 stores an identification of the kind of operation that caused the cache miss, for future use when the L2 cache or main memory are ultimately accessed. For use in managing the access request, registers 82 and 84 store addresses associated with the data access request; register 82 stores a subset of the bits of the effective address of the access, sufficient to identify the corresponding line for the access in the L1 cache; register 84 stores the real address for the access. The effective address registers 82 is used in determining the location of data being returned in response to the access, as noted below, and the real address register 84 is used to confirm that speculatively forwarded data is valid, as described below in connection with FIG. 3C. Register 86 stores the identity of the thread which produced the access request being serviced by the sequencer; this is used when data is returned to a thread from the L2 cache 16 or main memory 12, to inform the execution units 6 of the thread for which the data is returning, allowing the execution units 6 to determine how to handle the data. Register 88 identifies the line in cache buffer 30 which has been assigned to the data access being managed by sequencer 50. The remaining registers in sequencer 50 are used to manage the state of sequencer 50 so that sequencer 50 makes an appropriate response to activities of other elements of the storage control unit 10, as described in detail in connection with FIGS. 3A through 3D. Register 90 identifies the state of transfer of the data in response to the access, and is updated as the access request is handled by sequencer 50. Register 92 is a "valid" flag and identifies whether the sequencer 50 is currently in use and handling a data access request for which there was a cache miss. Finally, register 94 is a "designated" flag used to indicate whether the sequencer is handling the most recent incompletely serviced cache miss for a thread. The use of the valid and designated flags in managing data access requests is elaborated below with reference to FIGS. 3A through 3D.

Referring now to FIGS. 3A through 3D the processes performed by data sequencers 50a, 50b and 50c in managing delivery of data to execution units 6 in response to access requests, can be explained.

Figure 3A:
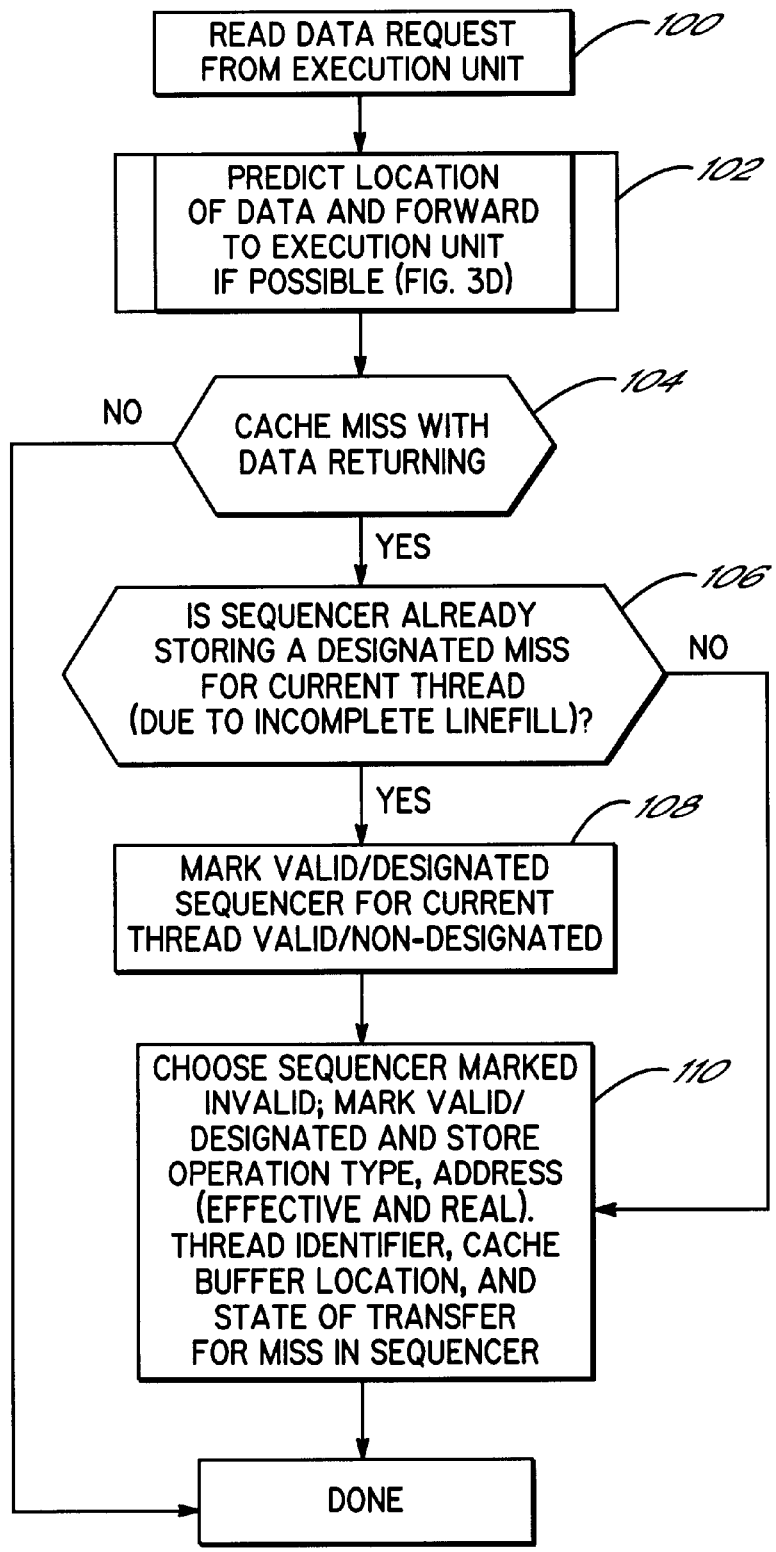
FIG. 3A is a flow chart of the operations performed by the sequencers illustrated in FIG. 1 upon receipt of a data access request from an execution unit.

FIG. 3A illustrates the steps taken by sequencers 50 when a data access request is received 100 from an execution unit, indicating that the execution unit is awaiting delivery of data from memory. Access requests requiring delivery of data to execution units 6 invoke the functions of sequencers 50 which are the subject of the present application. Other access requests, such as storage of data to memory, do not involve the subsequent delivery of returning data to execution units 6, and are handled by sequencers 50 in cooperation with cache buffer 30 and cache buffer control circuit 40 in the manner described in detail in above-referenced U.S. patent application Ser. No. 08/761,378.

Access requests requiring delivery of data to execution units 6 can be generated by execution units 6 as part of execution of a thread, or can be generated when execution units 6 switch to a thread which was previously suspended while awaiting return of data from storage control unit 10. In the latter case, as noted above, the pipelines of the execution units 6 are reloaded with the appropriate state, and execution of instructions for the resumed thread commences. Further details on these operations are provided in the above-referenced U.S. application Ser. No. 08/473,692.

In responding to a data access request requiring delivery of data to execution units 6, as a first step, sequencers 50 perform a process 102, described in FIG. 3D below, to predict the location of the data that must be loaded into the execution unit. As part of this process, the data may be delivered to the execution unit from the L1 cache 14 via bus 43, or from the cache buffer 30 via bus 36. As described below, if the data can be delivered immediately from one of these sources, then there is a cache "hit"; however, if the data cannot be immediately delivered from one of these sources, there is a cache "miss". If there is a miss, cache buffer control circuit 40 is notified of the miss as part of process 102, causing cache buffer control circuit 40 to begin the process of identifying the location of the needed data in L2 cache 16 or main memory 12, and obtaining the needed data.

After the process 102, at step 104, different actions are taken based on whether there has been a cache miss, for which data will be returning from the L2 cache or main memory 12. If there has not been a cache miss, then the needed data has been returned to the execution unit, and the processing of the request from the execution unit is done. However, if there has been a cache miss, then steps are taken to initialize a sequencer to manage the return of the data in response to the cache miss.

In a first step 106 following a cache miss, the registers of the three sequencers 50a, 50b and 50c are evaluated to determine whether any of the three sequencers is already managing the return of data in connection with a previous cache miss for the same thread. This may occur, as described above, where the desired data for the thread has been delivered to that thread either through a bypass path 24 or 26, or directly from the cache buffer 30, but the entire cache line containing the delivered data has not yet been linefilled from cache buffer 30 into the L1 cache 14. If, in step 106, there is a sequencer that is already managing the return of data in connection with a previous cache miss for the same thread, the registers 86, 92 and 94 (FIG. 2) of the sequencer will identify the thread, indicate that the sequencer is valid, and indicate that the sequencer is designated.

If there is already a sequencer which is both valid and marked designated for the same thread, due to an as-yet incomplete linefill, in step 108 this existing valid sequencer is marked "non-designated", by modifying register 94 of the existing valid sequencer. After this modification, the registers of the existing valid sequencer will indicate that although the sequencer is valid and managing the return of data for the same thread, it is not the most recent cache miss for the thread. As a result, as discussed below in connection with FIG. 3D, a more accurate prediction of the location of returning data can be made.

After step 108, or immediately after step 106 if there are no other valid sequencers for the same thread, in step 110, a sequencer is assigned to managing the return of data for the cache miss that was detected in step 104. In this step, the three sequencers 50a, 50b and 50c are evaluated to select a sequencer which is marked invalid in its register 92 (FIG. 2). As noted above, because there are only two threads, and three sequencers 50a, 50b and 50c for managing the delivery of data to execution units 6, there will always be a sequencer available when there is a cache miss. In other embodiments where there are more than two threads, additional sequencers would need to be included to ensure that there is always a sequencer available when there is a cache miss.

In step 110, the chosen sequencer is associated with the thread experiencing the miss, by storing an identifier for the thread in register 86 of the sequencer, the chose sequencer is marked valid in register 92, and also marked designated in register 94, thus indicating that the sequencer is managing the most recent cache miss for the thread. In addition, the type of memory access operation is stored in the sequencer in register 80, along with the real and effective addresses of the access in registers 82 and 84, and the state of transfer of the miss in register 90 is initialized to indicate that as yet the data has yet to be returned to cache buffer 30 from L2 cache 16 or main memory 12. Finally, the sequencer stores the cache buffer line that will be used to buffer the cache line returning to the L1 cache in response to the miss, which was assigned by cache buffer control circuit 40 when notified of the cache miss as part of process 102 (see FIG. 3D). This various data stored in the sequencer is used later, when data is returned to the cache buffer, to predict the location of the returning data and speculatively return it to the execution units 6, as well as to verify the location of the data while it is being speculatively returned to the execution units.

After thus initializing a sequencer to manage the return of data in response to a cache miss, processing of the data access request is done. Thereafter, cache buffer control circuit 40, having been notified of the miss, continues the process of obtaining the needed data from the L2 cache 16 if possible, and if not, from main memory 12, as described in the above-referenced U.S. patent application Ser. No. 08/761,378.

Figure 3B:
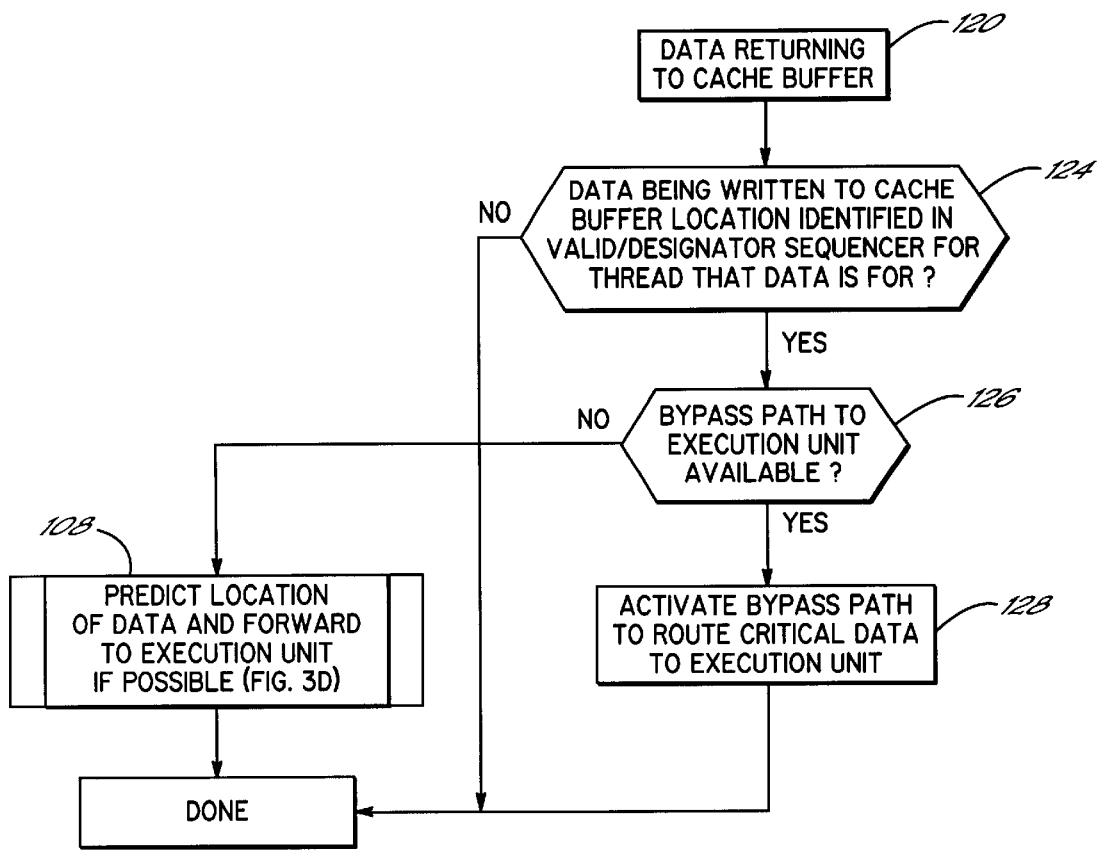
FIG. 3B is a flow chart of the operations performed by the sequencers illustrated in FIG. 1 upon return of data to the cache buffer illustrated in FIG. 1.

Referring now to FIG. 3B, when cache buffer control circuit 40 is successful in locating the desired data and causing the desired data to return to the cache buffer 30, in step 120 cache buffer control circuit 40 notifies sequencers 50 of the return of data, the thread for which the data is being returned, and the cache buffer line to which the data is being returned. In response, various steps are taken by sequencers 50 to appropriately deliver the data to the execution units 6.

Initially, a determination is made in step 124 whether the returning data relates to the most recent cache miss experienced by the thread that the data is intended for. If the returning data relates to the most recent cache miss experienced by the thread for which the data is intended, then that thread is stalled awaiting the return of the data, and the data should be delivered to the execution units 6 as soon as possible. To determine whether the returning data relates to the most recent cache miss of the thread for which it is intended, the registers of the sequencers 50a, 50b and 50c are evaluated to locate the valid, designed sequencer for the thread for which the data is intended. This sequencer identifies the most recent cache miss for the thread. Then, in step 124, the cache buffer line identified in register 88 by the located sequencer is compared to the cache buffer line identified by cache buffer control circuit 40 to which the returning data is being delivered. If the cache buffer lines match, then the returning data is for the most recent cache miss for the thread to which the data is intended, and the thread is stalled awaiting return of the data. If the cache buffer lines do not match, then the returning data does not relate to the most recent cache miss for the thread; for example, the returning data may complete a cache buffer line for a prior cache miss for which the execution units 6 have already received the critical data. Accordingly, if the cache buffer lines do not match, then the sequencers taken no further action.

However, if the returning data does relate to the most recent cache miss, in step 126 a determination is made whether it is possible to bypass the returning data to the execution units 6. This determination includes evaluating whether a bypass path is currently available, i.e., whether bus 24 is currently available if data is being returned from L2 cache 16, or alternatively whether bypass bus 26 is currently available if data is being returned from main memory 12. As noted above, bypass busses 24 and 26 are used to deliver instructions to instruction unit 22 and instruction cache 18, as managed by other sequencers not shown in FIG. 1, and accordingly these busses may not be available at all times.

If a path to the execution units 6 is available at step 126, in step 128 the critical data needed by the execution units 6, i.e., the specific memory locations requested by the execution units 6 in the request which generated the miss, is bypassed to the execution units 6, by controlling multiplexer 32 to deliver data from bus 24 or 26, as appropriate to bus 8 leading to execution units 6. After this step has been performed, then the thread, having received the critical data, may continue execution, while the cache buffer control circuit 40 proceeds to collect the remaining data for the cache line containing the critical data, and linefill this line into the L1 cache. If the thread receiving the data is the currently active thread, then the execution units 6 will immediately resume processing. If the thread receiving the data is not the currently active thread, then the data delivered to the execution units 6 is stored in registers in execution units 6 for immediate retrieval and use when the thread becomes active. Further information on this operation can be found in the above-referenced U.S. patent application Ser. No. 08/773,572. Accordingly, after step 126, sequencers 50 take no further action in response to the returning data.

Figure 3C:
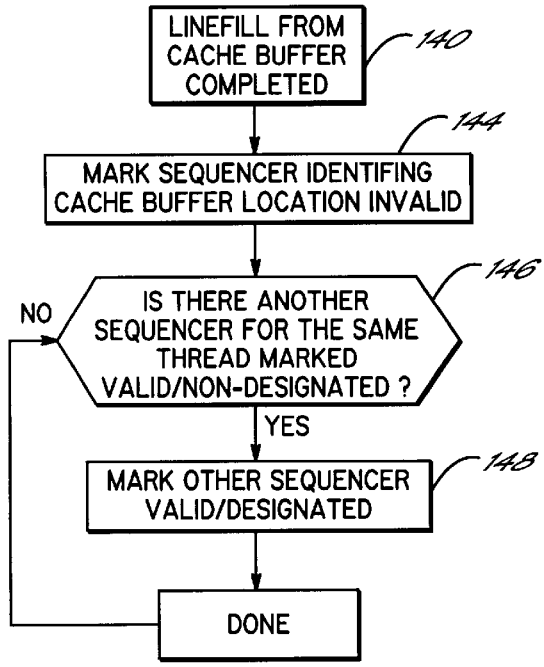
FIG. 3C is a flow chart of the operations performed by the sequencers illustrated in FIG. 1 upon completion of linefill from a cache buffer line into the cache illustrated in FIG. 1.
Figure 3D:
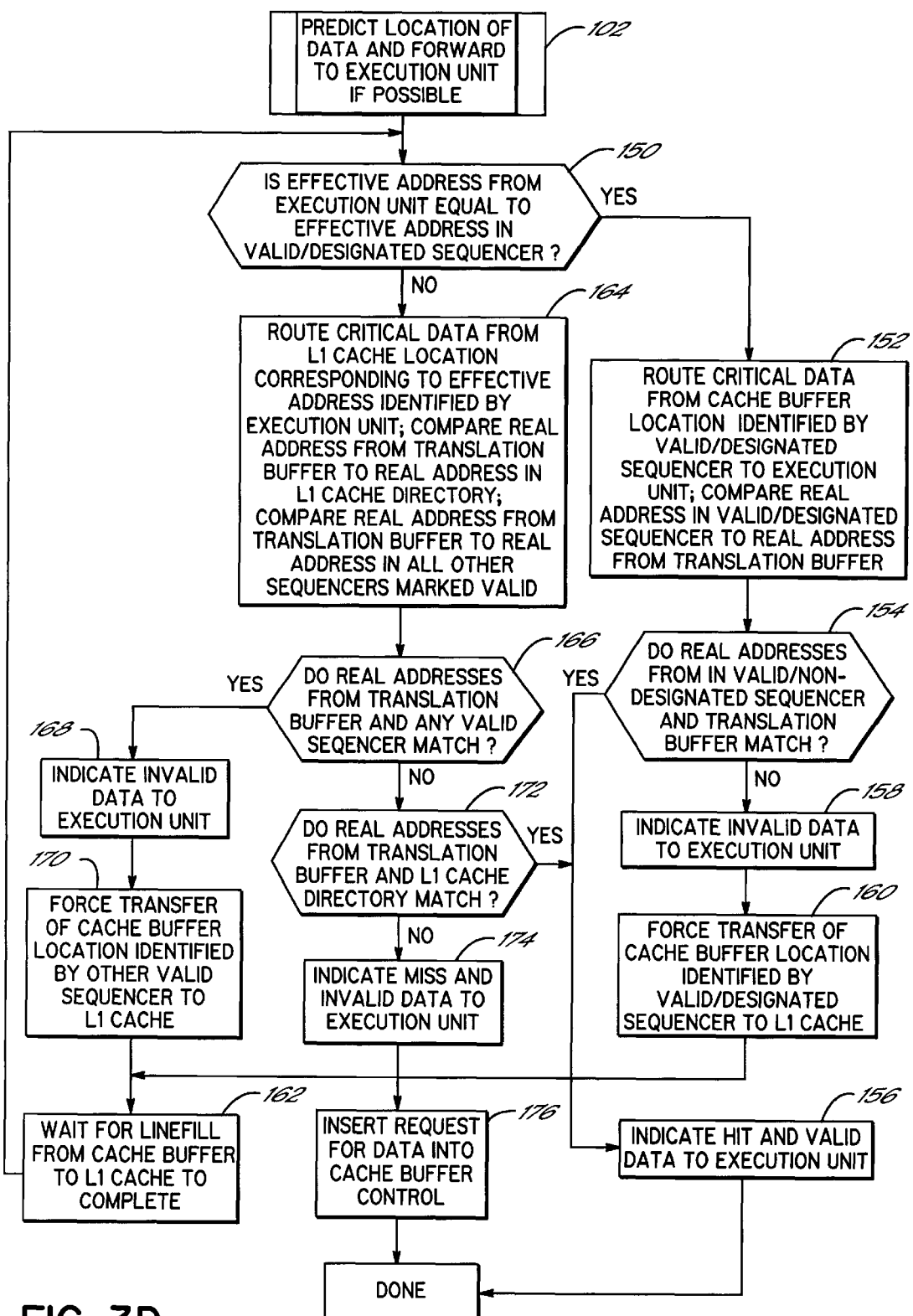
FIG. 3D is a flow chart of the detailed operations performed by the sequencers illustrated in FIG. 1 as part of predicting the location of data in the storage control unit and speculatively forwarding data to an execution unit in response to a prediction.

If, however, a bypass path to the execution units 6 is not available at step 126, then the sequencers proceed to execute the process 102 illustrated in FIG. 3D, to predict the location of the returning data, in either the cache buffer 30 or the L1 cache 14, and speculatively deliver the returning data to the execution units 6 while verifying the location of the data. This process will result in the ultimate delivery of the critical data to the execution units 6 from either cache buffer 30 or L1 cache 14, depending on the location of the data as it is transferred through cache buffer 30 to L1 cache 14, as discussed below with reference to FIG. 3D. Accordingly, after performing process 102, sequencers 50 take no further action in response to the returning data.

Referring now to FIG. 3C, the process by which a sequencer is marked invalid and released for future use can be explained. Specifically, when a linefill from cache buffer 30 to L1 cache 14 is completed, in step 140, notice of the completion of the linefill is delivered to sequencers 50 by cache buffer control circuit 40. In response, in step 144 the sequencer associated with the cache buffer line that completed the linefill is marked invalid in its register 92, indicating that the sequencer is no longer needed to manage the associated cache miss. Next, in step 146, the registers in the remaining sequencers are evaluated to determine whether there is another sequencer for the same thread which is marked as valid and non-designated. As noted above, there may be another valid sequencer for the same thread if the thread experiences a cache miss while the linefill for a previous cache miss is being completed. If in step 146 there are no other sequencers for the same thread which are marked valid and non-designated, then no further action is taken. However, if in step 146 there is an other sequencer for the same thread which is marked valid and non-designated, then in step 148 the other sequencer is marked designated, and processing is done. Accordingly, if the linefill for the most recent cache miss for a thread completes prior to the linefill for a prior cache miss, then the prior cache miss becomes the designated miss for the thread. As a result, if there is any cache miss for a thread for which linefilling to the L1 cache has not been completed, there will be a designated cache miss for the thread.

Referring now to FIG. 3D, details can be provided on the process 102 for predicting the location of data in the cache buffer 30 or L1 cache 40, and speculatively delivering the data to the execution units 6 while verifying the location of the data.

In the first step 150 of this process, the location of the data to be returned to the execution units 6 is predicted using data, stored in a sequencer, relating to the most recent cache miss for the thread requesting or receiving the data. Specifically, the registers in sequencers 50a, 50b and 50c are evaluated to locate the valid designated sequencer for the thread. Then, a subset of the effective address bits identified by the access request from the execution units, is compared to the corresponding subset of effective address bits stored in register 82 of the valid/designated sequencer.

If the effective address bits match in step 150, this indicates that the data being requested by the execution units 6 may be in the process of being returned to the L1 cache from the L2 cache 16 or main memory 12 via the cache buffer 30, in which case the desired data is available in cache buffer 30. However, since a group of different real addresses map to the same effective address, an effective address match with the designated sequencer in step 150 may also indicate that data which happens to have the same effective address as the desired data, but which is in fact from a different real address, is in the process of being returned to the L1 cache via the cache buffer 30, in which case the desired data is not available in either the cache buffer 30 or the L1 cache. Notably, however, the only possibility in which the data is available for immediate delivery to the execution units 6, is the first possibility where the data is available in the cache buffer 30.

Accordingly, if the effective address bits match in step 150, in step 152, register 88 of the valid/designated sequencer is accessed and used to locate the line in cache buffer 30 which may contain the desired data, and from that line, the critical data requested by the execution units 6 is forwarded to the execution units. Meanwhile, register 84 of the valid/designated sequencer is accessed, to determine the real address range which is associated with the cache buffer line from which the data is being forwarded. This real address is compared to the real address corresponding to the requested data access, as produced by the translation buffer 13. As noted above, when a cache miss is reported to cache buffer control circuit 40, the L1 cache directory 15 and sequencer are immediately updated to identify the real address range of the cache line which will be delivered into the appropriate L1 cache line in response to the miss. Accordingly, in step 152, if the valid/designated sequencer indicates that the L1 cache 14 is awaiting delivery of a real address range that includes the real address for which access is requested, then it can be confirmed that the data speculatively forwarded from cache buffer 30 to the execution units 6, is the data sought by the execution units 6, otherwise not.

Therefore, in step 154, a determination is made whether the real address range identified by the valid/designated sequencer includes the real address identified by the translation buffer 13. If so, then in step 156, a cache hit is indicated and the execution units 6 are informed over lines 65 (FIG. 1) that the speculatively forwarded data is valid. Since the execution units 6 have thus received the desired data, the process 102 is then done.

If, however, in step 154 the real address range identified by the valid/designated sequencer does not include the real address identified by the translation buffer 13, then the data speculatively forwarded from the cache buffer 30 is not the data desired by the execution units 6. Accordingly, in this case, in step 158, the execution units 6 are informed that the data that was forwarded is invalid and should be discarded.

When step 158 is reached, it has been determined that the execution units 6 are requesting delivery of data from an effective address which corresponds to an L1 cache line that is in the process of being linefilled from cache buffer 30, with data other than that which the execution units are seeking. This is a condition that could create substantial delays in storage control unit 10, due to the appearance that the data being requested by the execution units 6 is available from the cache buffer 30, which would repeatedly cause delivery of invalid data to the execution units 6, followed by notification that the data is invalid in step 158. Accordingly, after step 158, in step 160 the sequencers 50 communicate with cache buffer control circuit 40 to force the immediate transfer of the cache buffer line identified in register 88 by the valid/designated sequencer for the thread, to the L1 cache 14. Then, in step 162, the sequencers wait until the linefill from this cache buffer line to the L1 cache is complete. Only after the linefill is complete, will step 150 be repeated to attempt to predict the location of the data sought by the execution units 6. It will be noted that once the linefill from the cache buffer line to the L1 cache is complete, as a result of the process described above with reference to FIG. 3C, the valid/designated sequencer for the thread will be marked invalid. As a result, there will be a different designated sequencer, or no designated sequencer at all when step 150 is repeated.

Returning then to step 150, if there is no designated sequencer for the thread, which might occur when process 102 is initiated due to a thread requesting data, or if the effective address stored in the designated sequencer for the thread is not the same as the effective address from the execution unit, this may indicate one of several conditions. A first possibility is that the data being requested by the execution units 6 is not available in the L1 cache and is not being retrieved into the cache. A second possibility is that the data being requested by the execution units 6 is currently stored in the L1 cache and available for retrieval. A third possibility is that the data is being retrieved into the cache as a result of a prior miss generated by the same or another thread, which is being handled by another sequencer. Only under the second and third possibilities is the data available for retrieval. Furthermore, only under the second possibility can the location of the data be determined without referring to the registers in the other sequencers. Moreover, the second possibility is perhaps more likely to occur than the third.

Accordingly, if in step 150 there is no designated sequencer for the thread, or the effective address stored in the designated sequencer for the thread is different than the effective address from the execution unit, in step 164, the sequencer delivers a command to the L1 cache to route the critical data requested by the execution units 6 from the L1 cache line identified by the effective address from the execution units. Meanwhile, the sequencer accesses the real address range identified by the L1 cache directory for that L1 cache line, to compare this real address range to the real address requested by the execution units, as identified by the translation buffer 13. Furthermore, the sequencer accesses the registers in all other valid sequencers to compare the real addresses identified by the other sequencers to the real address identified by the translation buffer 13.

In step 164, if the real address range from the L1 cache directory does not include the real address of the access identified by the translation buffer 13, this indicates that the desired data is not in the L1 cache line and is not being retrieved into the L1 cache, the first possibility identified above. If, however, the real address range from the L1 cache directory includes the real address from the translation buffer 13, this indicates that the desired data is either in the L1 cache line, or is in the process of being retrieved into the L1 cache by another sequencer, the second and third possibilities identified above. In such a case, if the real address identified by the translation buffer 13 is not in the address range as the real address identified by any other sequencer, then it can be confirmed that the desired data is in the L1 cache. However, if the real address range identified by another valid sequencer includes the real address identified by the translation buffer 13, this indicates that another sequencer is in the process of retrieving the data for that address range into the L1 cache line, and further indicates that the desired data has not yet been linefilled into the L1 cache, as the other sequencer would have been marked invalid upon completion of the linefill, so that the data is either in cache buffer 30 or is awaiting delivery to cache buffer 30.

Accordingly, following step 164, in step 166, a determination is made whether the real address of the access from the translation buffer 13 is in the range of real addresses identified by any other valid sequencer. If so, then the desired data is not yet in the L1 cache 14, but rather is in the process of being delivered into the L1 cache by a sequencer. Accordingly, in this case, in step 168, the execution units 6 are informed that the data that was forwarded is invalid and should be discarded.

When step 168 is reached, it has been determined that the execution units 6 are requesting delivery of data from an effective address which corresponds to an L1 cache line for which data is being collected by a sequencer other than the designated sequencer for the thread. To avoid delays that this condition could create, in the next step 170 the sequencers 50 communicate with cache buffer control circuit 40 to force the immediate transfer of the cache buffer line identified in register 88 by the other sequencer, to the L1 cache 14. Then, in step 162, the sequencers wait until the linefill from this cache buffer line to the L1 cache is complete. Only after the linefill is complete, will step 150 be repeated to attempt to predict the location of the data sought by the execution units 6. It will be noted that once the linefill from the cache buffer line to the L1 cache is complete, as a result of the process described above with reference to FIG. 3C, the other sequencer will be marked invalid. As a result, after step 150 is repeated, in step 166 that other sequencer will not match to the real address from the execution unit.

If in step 166, the real address identified by the translation buffer 13 is not in the range of real addresses identified by any other valid sequencer, then the sequencers proceed to step 172. In step 172, a determination is made whether the real address identified by the translation buffer 13 is in the range of real addresses identified by the L1 cache directory 15. If so, the data previously forwarded from the L1 cache in step 164 was the correct data. Accordingly, in this case, in step 156, the execution units 6 are informed that there was a cache hit and that the data that was forwarded is valid, and then process 102 is complete. However, if in step 172, the real address identified by the execution units 6 is not in the range of real addresses identified by the L1 cache directory 15, then the data desired by the execution units is not available in either the cache buffer 30 or the L1 cache 14. Accordingly, in this situation, in step 174 a cache miss is indicated to the execution units 6, and at the same time the execution units are informed that the data previously forwarded from the L1 cache in step 164 is invalid. Next, in step 176, the sequencers 50 deliver a request to the cache buffer control circuit 40 indicating that the cache does not contain the desired data and that the desired cache line should be obtained from the L2 cache 16 or main memory 12. In response, cache buffer control circuit 40 assigns a line in cache buffer 30 to the project of obtaining the desired data into the L1 cache 14, and begins the process of obtaining the desired data. After these steps are taken, process 102 is completed.

Figure 4:
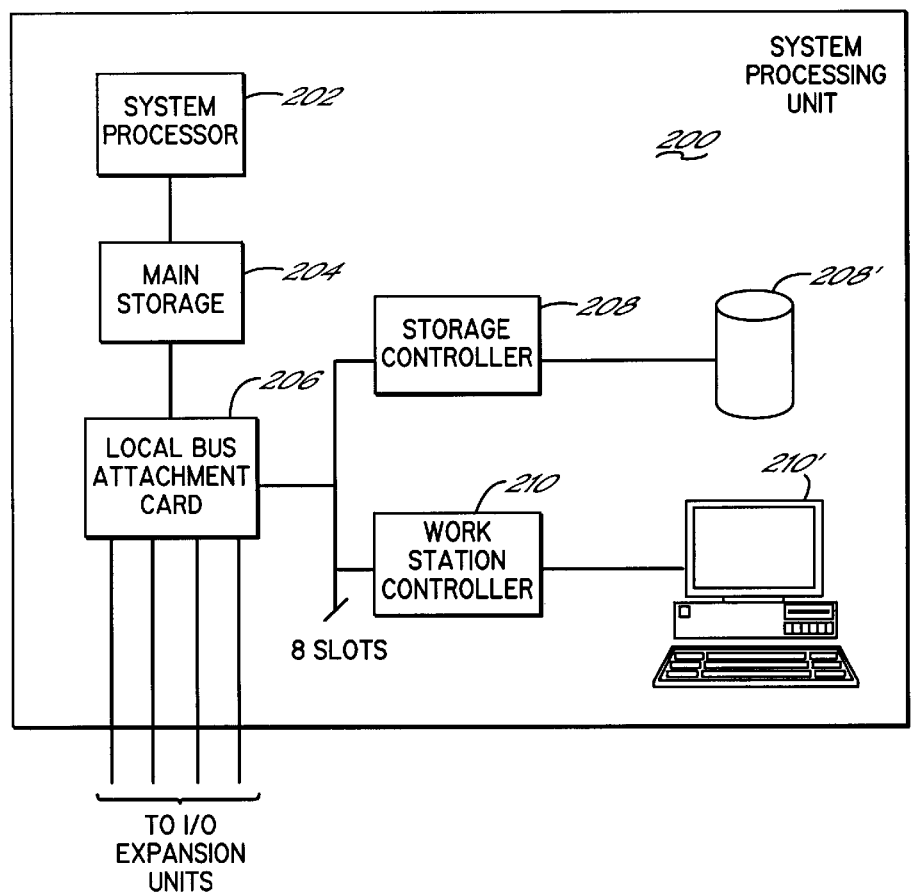
FIG. 4 is a block diagram of a computer system incorporating the storage control unit and other elements shown in the preceding Figs.

As seen in FIG. 4, a typical computer system using the storage control unit 10 described above may comprise a system processing unit 200 including a system processor 202 including execution units 6, a main storage unit 204 including storage control unit 10, a local bus attachment card 206 including modules for connecting fiber optic cables leading to input/output expansion units, a storage controller 208, with storage device 208', and work station controller 210, with work station 210'.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, a content addressable memory (CAM) could be used in cache buffer 30, to facilitate the process of determining whether a particular L1 cache line is available in cache buffer 30. In such an embodiment, a subset of the bits of the effective address of an access from the execution units 6, could be directly delivered to the content addressable memory to determine whether the CAM is storing a cache buffer line with the same subset of effective address bits, suggesting that an L1 cache line including the desired real address is being retrieved by the cache buffer control circuit 40 via the cache buffer 30. In such a case, step 150 of FIG. 3D would comprise comparing the subset of bits of effective address to the cache buffer CAM, and if there is a match, in step 152 routing data from the cache buffer line which matched, otherwise, in step 164 routing data from the L1 cache. In this approach, the forwarded data could be verified by comparing the real address from the execution units 6 to a real address of the matching CAM entry, or alternatively, comparing the real address from the execution units 6 to a real address from the L1 cache directory, while simultaneously comparing the real address from the execution units 6 to the real addresses of all other CAM entries, e.g., using another CAM.

This approach using a CAM avoids the need to identify a designated miss for each thread, thus eliminating need for the various logic needed to update the designated miss when there is a linefill and/or a new miss. However, the use of a CAM may have adverse cycle-time impacts, because the CAM hit needs to be known before the real address compare can be performed. In addition, if a second CAM is used to compare real addresses in the cache buffer to the real address from the execution units, there may be additional disadvantages in complexity and speed.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling a memory cache and cache buffer to forward memory contents being delivered to the memory cache via the cache buffer to a processor awaiting return of those memory contents, comprising providing a plurality of sequencers, each sequencer storing information used in managing linefilling of memory contents into the cache in response to a cache miss generated by the processor, storing in each sequencer an indication of the range of memory addresses that are to be linefilled into the memory cache in response to the cache miss the sequencer is managing, in response to a request from the processor, determining a location in said cache or cache buffer that would contain the memory contents that the processor is awaiting if those memory contents were in the memory cache or cache buffer, speculatively forwarding memory contents from the determined location in either the cache buffer or memory cache to the processor, and verifying that the speculatively forwarded memory contents are the memory contents that the processor is awaiting.

2. The method of claim 1 wherein the speculatively forwarding and verifying steps are performed concurrently.

3. The method of claim 1 further comprising if the speculatively forwarded memory contents are not the memory contents that the processor is awaiting, notifying the processor receiving the speculatively forwarded memory contents to ignore the forwarded memory contents.

4. The method of claim 1 further comprising receiving a memory access request from the processor, and in response performing said steps of determining, speculatively forwarding, and verifying.

5. The method of claim 1 further comprising detecting delivery of memory contents to the cache buffer after a prior cache miss resulting from failure to locate desired memory contents in the memory cache or cache buffer, and in response performing said steps of determining. speculatively forwarding, and verifying.

6. The method of claim 1 adapted for use with a multi-threading processor executing a plurality of threads, each thread generating memory access requests and cache misses resulting from failure to locate desired memory contents in the memory cache or cache buffer, wherein each sequencer stores information used in managing the return of memory contents in response to a cache miss generated by one of the plurality of threads, following the method of claim 1.

7. The method of claim 6 further comprising, when a cache miss is generated upon failure to locate desired memory contents in the memory cache or cache buffer,
enabling a sequencer and initializing the sequencer with information needed to manage the forwarding of memory contents to the processor in response to the cache miss.

8. The method of claim 7 further comprising, upon completion of a linefill of memory contents from the cache buffer to the memory cache in response to a miss, disabling the sequencer managing the return of memory contents in response to the miss.

9. The method of claim 6 wherein each sequencer stores the identity of the thread for which it is managing the return of memory contents.

10. The method of claim 6 adapted for use with a multithreading processor executing two threads, wherein there are three sequencers separately managing the return of memory contents in response to a cache miss.

11. The method of claim 7 further comprising, when a cache miss is generated upon failure to locate desired memory contents in a line of the memory cache or cache buffer,
enabling a sequencer and initializing the sequencer with the identity of the cache line, for use in managing forwarding of memory contents to the processor in response to the cache miss.

12. The method of claim 11 further comprising, upon issuance of a memory access request by the processor when executing a thread,
comparing the cache line identified by a sequencer associated with the thread, to the cache line which would contain the memory contents requested by the memory access request if those memory contents were in the memory cache, and
if the comparison produces a match, speculatively forwarding memory contents from the cache buffer to the processor, or
if the comparison does not produce a match, speculatively forwarding memory contents from the cache line which would contain the memory contents requested by the memory access request if those memory contents were in the memory cache, to the processor.

13. The method of claim 12 wherein each sequencer also stores an indication of whether the sequencer is a designated sequencer for a thread which is managing return of memory contents for the most recent incompletely serviced cache miss for the thread.

14. The method of claim 13 wherein in the comparing step, the cache line identified by the designated sequencer associated with the thread, is compared to the cache line which would contain the memory contents requested by the memory access request if those memory contents were in the memory cache.

15. The method of claim 13 wherein, when a cache miss is generated upon failure to locate in a line of the memory cache or cache buffer, memory contents requested by the processor executing a thread, and information is stored in a sequencer to manage forwarding of memory contents in response to the cache miss, the sequencer is marked as the designated sequencer for the thread, and any other sequencer managing a cache miss for the same thread is marked non-designated.

16. The method of claim 13 wherein, upon completion of a linefill from the cache buffer to the memory cache in response to a miss for which a designated sequencer is managing forwarding of memory contents, the designated sequencer is disabled, and another sequencer managing forwarding of memory contents for the same thread is marked designated.

17. The method of claim 1 further comprising providing a cache directory storing an indication of the memory contents which are present in each line of the memory cache.

18. The method of claim 1 further comprising, when a cache miss is generated upon failure to locate desired memory contents in a line of the memory cache or cache buffer, updating a cache directory to indicate, for the cache line, the range of memory addresses which will be linefilled into that cache line in response to the cache miss.

19. The method of claim 18 wherein the verifying step comprises comparing the memory address of the memory contents that the processor is awaiting, to a range of memory addresses in the cache directory, and in the absence of a match, notifying the processor receiving the speculatively forwarded memory contents to ignore the forwarded memory contents.

20. The method of claim 19 wherein
the verifying step further comprises comparing the memory address of the memory contents that the processor is awaiting, to the ranges of memory contents identified by one or more of the sequencers, and upon a match, notifying the processor receiving the speculatively forwarded memory contents to ignore the forwarded memory contents.

21. The method of claim 1, further comprising
providing a content-addressable memory identifying the lines in said memory cache to which memory contents stored in said cache buffer are to be linefilled, and wherein
determining the location that would contain the memory contents that the processor is awaiting comprises delivering to the content-addressable memory, the cache line in which the memory contents that the processor is awaiting would be stored if such memory contents were in said memory cache, and
if there is a match in the content-addressable memory, speculatively forwarding memory contents from a selected cache buffer line in which there was a match, and if there is not a match, speculatively forwarding memory contents from the memory cache.

22. The method of claim 21 further comprising providing a cache directory storing an indication of the memory contents which are present in each line of the memory cache, and when a cache miss is generated upon failure to locate desired memory contents in a line of the memory cache or cache buffer, updating the cache directory to indicate, for the cache line, the range of memory addresses which will be linefilled into that cache line in response to the cache miss, and wherein the verifying step comprises comparing the memory address of the memory contents that the processor is awaiting, to a range of memory addresses in the cache directory, and in the absence of a match, notifying the processor receiving the speculatively forwarded memory contents to ignore the forwarded memory contents.

23. The method of claim 21 further comprising providing a second content-addressable memory identifying the range of memory addresses of memory contents stored in each line in said cache buffer, and wherein the verifying step comprises comparing the memory address of the memory contents that the processor is awaiting, to the ranges of memory addresses in the second content-addressable memory, and if there is a match in a cache buffer line other than the selected cache buffer line, notifying the processor receiving the speculatively forwarded memory contents to ignore the forwarded memory contents.

24. A method of controlling a memory cache and cache buffer to forward memory contents being delivered to the memory cache via the cache buffer to a processor awaiting return of those memory contents, comprising upon detection of a cache miss due to failure to location desired memory contents in the memory cache or cache buffer, storing an address of the desired memory contents and a location in the cache buffer to which memory contents will subsequently be returned, upon delivery of memory contents to the cache buffer, comparing the location in the cache buffer to which the memory contents are being delivered, to the stored location, and speculatively forwarding memory contents from the stored cache buffer location upon detection of delivery of memory contents to the stored location, and comparing a memory address for memory contents currently requested by the processor to the stored address of desired memory contents, and upon a match, verifying that the speculatively forwarded memory contents are the memory contents that the processor is awaiting.

25. The method of claim 24 wherein the speculatively forwarding and comparing steps are performed concurrently.

26. The method of claim 24 further comprising if the memory address for memory contents currently requested by the processor does not match the stored address of desired memory contents, notifying the processor receiving the speculatively forwarded memory contents to ignore the forwarded memory contents.

27. A method of controlling a memory cache and cache buffer to forward memory contents being delivered to the memory cache via the cache buffer to a processor awaiting return of those memory contents, comprising upon detection of a cache miss due to failure to location desired memory contents in the memory cache or cache buffer, storing an address of the desired memory contents, a location in the cache buffer to which memory contents will subsequently be returned, and a location in the memory cache to which memory contents will subsequently be returned, in response to a request for delivery of memory contents from the processor, comparing a location in the memory cache in which the memory contents requested by the processor would be found if those contents were in the memory cache, to the stored location in the memory cache to which memory contents will subsequently be returned, and if the locations in the memory cache match, speculatively forwarding memory contents from the stored cache buffer location, and comparing a memory address for memory contents currently requested by the processor to the stored address of desired memory contents, and if the memory addresses match, verifying that the speculatively forwarded memory contents are the memory contents that the processor is awaiting, or if the locations in the memory cache do not match, speculatively forwarding memory contents from the location in the memory cache in which the memory contents requested by the processor would be found if those contents were in the memory cache, and comparing a memory address for memory contents currently requested by the processor to memory addresses of memory contents in the memory cache, and if the memory addresses match, verifying that the speculatively forwarded memory contents are the memory contents that the processor is awaiting.

28. The method of claim 27 wherein the speculatively forwarding and comparing steps are performed concurrently.

29. The method of claim 27 further comprising if the locations in the memory cache match, but the memory addresses do not match, notifying the processor receiving the speculatively forwarded memory contents to ignore the forwarded memory contents, and if the locations in the memory cache do not match, and the memory addresses do not match, notifying the processor receiving the speculatively forwarded memory contents to ignore the forwarded memory contents.

30. A storage control unit for forwarding memory contents to a processor awaiting return of those memory contents, comprising a memory cache, a cache buffer, and a plurality of sequencers for controlling the memory cache and cache buffer to forward memory contents, each sequencer:

storing information used in managing the return of memory contents in response to a cache miss generated by the processor, including an indication of the range of memory addresses that are being linefilled into the memory cache in response to the cache miss the sequencer is managing, one of said sequencers responding to a request from the processor by determining a location in said memory cache or cache buffer that could contain the memory contents that the processor is awaiting if those memory contents were in the memory cache or cache buffer, speculatively forwarding memory contents from either the cache buffer or memory cache to the processor, and verifying that the speculatively forwarded memory contents are the memory contents that the processor is awaiting.

31. The storage control unit of claim 30 wherein the responding sequencer speculatively forwards memory contents concurrently with verifying that the speculatively forwarded memory contents are the memory contents that the processor is awaiting.

32. The storage control unit of claim 30 wherein the responding sequencer notifies the processor receiving the speculatively forwarded memory contents to ignore the forwarded memory contents if the speculatively forwarded memory contents are not the memory contents that the processor is awaiting.

33. The storage control unit of claim 30 wherein the responding sequencer is responsive to receipt of a memory access request from the processor, and in response determines the possible location of and speculatively forwards memory contents.

34. The storage control unit of claim 30 wherein the responding sequencer detects delivery of memory contents to the cache buffer after a prior cache miss resulting from failure to locate desired memory contents in the memory cache or cache buffer, and in response determines the possible location of and speculatively forwards memory contents.

35. The storage control unit of claim 30 adapted for use with a multithreading processor executing a plurality of threads, each thread generating memory access requests and cache misses resulting from failure to locate desired memory contents in the memory cache or cache buffer, wherein each sequencer stores information used in managing the return of memory contents in response to a cache miss generated by one of the plurality of threads.

36. The storage control unit of claim 35 wherein each of said sequencers is enabled and initialized with information needed to manage the forwarding of memory contents to the processor in response to a cache miss generated upon failure to locate desired memory contents in the memory cache or cache buffer.

37. The storage control unit of claim 36 wherein each of said sequencers is disabled upon completion of a linefill of memory contents from the cache buffer to the memory cache in response to a miss.

38. The storage control unit of claim 35 wherein each sequencer stores the identity of the thread for which it is managing the return of memory contents.

39. The storage control unit of claim 35 adapted for use with a multithreading processor executing two threads, wherein there are three sequencers separately managing the return of memory contents in response to a cache miss.

40. The storage control unit of claim 36 wherein a sequencer is enabled and initialized with the identity of the cache line which will be used in forwarding memory contents to the processor in response to a cache miss is generated upon failure to locate desired memory contents in a line of the memory cache or cache buffer.

41. The storage control unit of claim 40 wherein upon issuance of a memory access request by the processor when executing a thread, a sequencer compares the cache line identified by the sequencer, to the cache line which would contain the memory contents requested by the memory access request if those memory contents were in the memory cache, and if the comparison produces a match, speculatively forwards memory contents from the cache buffer to the processor, or if the comparison does not produce a match, speculatively forwards memory contents from the cache line which would contain the memory contents requested by the memory access request if those memory contents were in the memory cache, to the processor.

42. The storage control unit of claim 41 wherein each sequencer also stores an indication of whether the sequencer is a designated sequencer for a thread which is managing return of memory contents for the most recent incompletely serviced miss for the thread.

43. The storage control unit of claim 42 wherein a sequencer compares the cache line identified by the sequencer, to the cache line which would contain the memory contents requested by the memory access request if those memory contents were in the memory cache.

44. The storage control unit of claim 42 wherein a sequencer becomes a designated sequencer for a thread when a cache miss is generated upon failure to locate desired memory contents in a line of the memory cache or cache buffer, and information is stored in the sequencer to manage forwarding of memory contents in response to the cache miss, and any other sequencer managing a miss for the same thread is marked non-designated under the same circumstances.

45. The storage control unit of claim 42 wherein, upon completion of a linefill from the cache buffer to the memory cache in response to a miss for which a designated sequencer is managing forwarding of memory contents, the designated sequencer is disabled, and another sequencer managing forwarding of memory contents for the same thread is marked designated.

46. The storage control unit of claim 30 further comprising a cache directory storing an indication of the memory contents which are present in each line of the memory cache.

47. The storage control unit of claim 30 wherein, when a cache miss is generated upon failure to locate desired memory contents in a line of the memory cache or cache buffer, a cache directory is updated to indicate, for the cache line, the range of memory addresses which will be linefilled into that cache line in response to the cache miss.

48. The storage control unit of claim 47 wherein the memory address of the memory contents that the processor is awaiting, is compared to a range of memory addresses in the cache directory, and in the absence of a match, the sequencer notifies the processor receiving the speculatively forwarded memory contents to ignore the forwarded memory contents.

49. The storage control unit of claim 48 further comprising
a plurality of sequencers, each sequencer storing information used in managing the return of memory contents in response to a cache miss generated by the processor, including an indication of the range of memory addresses that are being linefilled into the memory cache in response to the cache miss the sequencer is managing, wherein
speculatively forwarded memory contents are verified by comparing the memory address of the memory contents that the processor is awaiting, to the ranges of memory contents identified by one or more of the sequencers.

50. The storage control unit of claim 30, further comprising
a content-addressable memory identifying the lines in said memory cache to which memory contents stored in said cache buffer are to be linefilled, and wherein
the sequencer determines the location in said memory cache or cache buffer that would contain the memory contents that the processor is awaiting by delivering to the content-addressable memory, the cache line in which the memory contents that the processor is awaiting would be stored if such memory contents were in said memory cache, and if there is a match in the content-addressable memory, the sequencer speculatively forwards memory contents from a selected cache buffer line in which there was a match, and if there is not a match, the sequencer speculatively forwards memory contents from the memory cache.

51. The storage control unit of claim 50 further comprising
 a cache directory storing an indication of the memory contents which are present in each line of the memory cache, or which will be linefilled into each line of the memory cache in response to a cache miss generated upon failure to locate desired memory contents in a line of the memory cache or cache buffer, wherein
 the sequencer verifies speculatively forwarded memory contents by comparing the memory address of the memory contents that the processor is awaiting, to a range of memory addresses in the cache directory, and in the absence of a match, notifies the processor receiving the speculatively forwarded memory contents to ignore the forwarded memory contents.

52. The storage control unit of claim 50 further comprising
 a second content-addressable memory identifying the range of memory addresses of memory contents stored in each line in said cache buffer, and wherein
 the sequencer verifies speculatively forwarded memory contents by comparing the memory address of the memory contents that the processor is awaiting, to the ranges of memory addresses in the second content-addressable memory, and if there is a match in a cache buffer line other than the selected cache buffer line, notifies the processor receiving the speculatively forwarded memory contents to ignore the forwarded memory contents.

53. A storage control unit, comprising
 a memory cache storing memory contents and addresses of those memory contents,
 a cache buffer buffering memory contents being delivered to the memory cache via the cache buffer,
 a sequencer responding to a cache miss due to failure to location desired memory contents in the memory cache or cache buffer, by storing an address of desired memory contents and a location in the cache buffer to which memory contents will subsequently be returned, the sequencer further responding to delivery of memory contents to the cache buffer, by
  comparing the location in the cache buffer to which the memory contents are being delivered, to the stored location,
  speculatively forwarding memory contents from the stored cache buffer location upon detection of delivery of memory contents to the stored location, and
  comparing a memory address for memory contents currently requested by the processor to the stored address of desired memory contents, and upon a match, verifying that the speculatively forwarded memory contents are the memory contents that the processor is awaiting.

54. The storage control unit of claim 53 wherein the sequencer speculatively forwards memory contents concurrently with comparing memory addresses.

55. The storage control unit of claim 53 wherein the sequencer is further responsive to delivery of memory contents to the cache buffer when the memory address for memory contents currently requested by the processor does not match the stored address of desired memory contents, by notifying the processor receiving the speculatively forwarded memory contents to ignore the forwarded memory contents.

56. A storage control unit, comprising
 a memory cache storing memory contents and addresses of those memory contents,
 a cache buffer buffering memory contents being delivered to the memory cache via the cache buffer,
 a sequencer responding to a cache miss due to failure to location desired memory contents in the memory cache or cache buffer, by storing an address of the desired memory contents, a location in the cache buffer to which memory contents will subsequently be returned, and a location in the memory cache to which memory contents will subsequently be returned, the sequencer further responding to a request for delivery of memory contents from the processor, by
  comparing a location in the memory cache in which the memory contents requested by the processor would be found if those contents were in the memory cache, to the stored location in the memory cache to which memory contents will subsequently be returned, and
  if the locations in the memory cache match, speculatively forwarding memory contents from the stored cache buffer location, and comparing a memory address for memory contents currently requested by the processor to the stored address of desired memory contents, and if the memory addresses match, verifying that the speculatively forwarded memory contents are the memory contents that the processor is awaiting, or
  if the locations in the memory cache do not match, speculatively forwarding memory contents from the location in the memory cache in which the memory contents requested by the processor would be found if those contents were in the memory cache, and comparing a memory address for memory contents currently requested by the processor to memory addresses of memory contents in the memory cache, and if the memory addresses match, verifying that the speculatively forwarded memory contents are the memory contents that the processor is awaiting.

57. The storage control unit of claim 56 wherein the sequencer speculatively forwards memory contents concurrently with comparing memory addresses.

58. The storage control unit of claim 56 wherein
 the sequencer is further responsive to a request for delivery of memory contents from the processor if the locations in the memory cache match, but the memory addresses do not match, by notifying the processor receiving the speculatively forwarded memory contents to ignore the forwarded memory contents, and
 the sequencer is further responsive to a request for delivery of memory contents from the processor if the locations in the cache do not match, and the memory addresses do not match, by notifying the processor receiving the speculatively forwarded memory contents to ignore the forwarded memory contents.

59. A computer system, comprising
 a processor,
 an input/output device connected to the processor for delivering information to the processor and outputting information produced by the processor, a memory connected to the processor for storing information for the processor, a memory cache connected to the memory and processor for storing copies of the information in the memory for ready access by the processor, and a storage control unit for receiving a request for memory contents from the processor and forwarding memory contents to the processor in response to the request, comprising a cache buffer, and a plurality of sequencers controlling the memory cache and cache buffer to forward memory contents to the processor, each sequencer:

storing information used in managing the return of memory contents in response to a cache miss generated by the processor, including an indication of the range of memory addresses that are being linefilled into the memory cache in response to the cache miss the sequencer is managing, one of said sequencers responding to a request from the processor by determining the location in said cache or cache buffer that would contain of memory contents that the processor is awaiting if those memory contents were in either the memory cache or cache buffer, speculatively forwarding memory contents from either the cache buffer or memory cache to the processor, and verifying that the speculatively forwarded memory contents are the memory contents that the processor is awaiting.

60. The computer system of claim 59 wherein the responding sequencer of the storage control unit speculatively forwards memory contents concurrently with verifying that the speculatively forwarded memory contents are the memory contents that the processor is awaiting.

61. The storage control unit of claim 59 wherein the responding sequencer notifies the processor to ignore the speculatively forwarded memory contents if the speculatively forwarded memory contents are not the memory contents that the processor is awaiting.

* * * * *